United States Patent [19]

Phillips

[11] Patent Number: 4,661,258
[45] Date of Patent: Apr. 28, 1987

[54] TRAVELING BED ION EXCHANGE CONTACT APPARATUS AND PROCESS EMPLOYING SAME

[75] Inventor: Gary C. Phillips, Lake Jackson, Tex.

[73] Assignee: The Dow Chemical Company, Midland, Mich.

[21] Appl. No.: 514,919

[22] Filed: Jul. 18, 1983

Related U.S. Application Data

[63] Continuation-in-part of Ser. No. 416,827, Sep. 13, 1982, abandoned, which is a continuation-in-part of Ser. No. 239,794, Mar. 2, 1981, abandoned, which is a continuation-in-part of Ser. No. 7,089, Jan. 29, 1979, abandoned, which is a continuation-in-part of Ser. No. 875,355, Feb. 6, 1978, abandoned, which is a continuation-in-part of Ser. No. 788,196, Apr. 18, 1977, abandoned, which is a continuation-in-part of Ser. No. 646,201, Jan. 2, 1976, abandoned.

[51] Int. Cl.⁴ .................................... B01D 15/02
[52] U.S. Cl. .................................... 210/661; 210/189; 210/286; 210/291
[58] Field of Search .................... 55/77, 390; 210/189, 210/263, 268, 285, 286, 289–291, 661, 676, 681; 422/139, 140, 143, 145

[56] References Cited

U.S. PATENT DOCUMENTS

| 2,742,381 | 4/1956 | Weiss et al. | 210/661 |
| 3,503,184 | 3/1970 | Knapp et al. | 55/77 |
| 3,667,604 | 6/1972 | Lagoutte | 210/189 |

Primary Examiner—Ivars Cintins
Attorney, Agent, or Firm—James G. Carter

[57] ABSTRACT

A technique for contacting a fluid with an ion exchange resin which comprises flowing the contacting fluid through a moving bed of ion exchange resin in a direction essentially perpendicular to the direction of flow of said ion exchange resin bed.

18 Claims, 7 Drawing Figures

TRAVELING BED ION EXCHANGE CONTACT APPARATUS AND PROCESS EMPLOYING SAME

CROSS REFERENCE TO RELATED APPLICATION

This application is a continuation-in-part of my copending application Ser. No. 416,827 filed Sept. 13, 1982, now abandoned, which is a continuation-in-part of application Ser. No. 239,794, filed Mar. 2, 1981, now abandoned, which is a continuation-in-part of application Ser. No. 007,089 filed Jan. 29, 1979, now abandoned, which is a continuation-in-part of application Ser. No. 875,355 filed Feb. 6, 1978, now abandoned, which is a continuation-in-part of application Ser. No. 788,196, filed Apr. 18, 1977, now abandoned, which is a oontinuation-in-part of application Ser. No. 646,201, filed Jan. 2, 1976, now abandoned.

The present invention concerns a traveling bed ion exchange or ion concentrating apparatus and process employing such apparatus.

Ion exchange or ion concentrating processes are well known in the art and generally employ a fixed bed ion exchange or ion concentrating medium contact apparatus or a flow through apparatus where the contacting liquid and the ion exchange or concentrating resin beads pass through the contactor in parallel countercurrent flow.

Each of these processes have one or more disadvantages such as
(1) high energy requirements (pressure drop due to flow),
(2) plugging of the ion exchange bed by dirt, fine resin and the like,
(3) necessity of designing fixed bed units with 50-100% empty volume above the resin for backwashing purposes to remove dirt and/or fine particles of ion exchange resin,
(4) frequent necessity to perform an ion exchange operation where the flow rates of the different fluids are greatly different causing design and distribution problems.

One or more of these disadvantages have now been overcome by the apparatus and process of the present invention wherein a mass of ion exchange or ion concentrating resin travels along a plane and the stream to be contacted passes up through the traveling bed of ion exchange or ion concentrating resin in non-parallel flow, essentially perpendicular (i.e., within about 15° of perpendicular) to the planar flow of the resin bed.

Ion exchange resin or ion concentrating processes for concentrating or removing ions from fluids are well known and usually consist of
(1) a resin loading step or stage and
(2) a resin regeneration step or stage. Each of the steps or stages can be performed in one process unit or in separate units.

These are well known and described in U.S. Pat. Nos. 2,671,714; 2,772,143; 2,814,399; 2,897,051 and 3,056,651 all of which are incorporated herein by reference.

SUMMARY OF THE INVENTION

The present invention is directed to an improvement in such a process and an apparatus or contactor therefor, the improvement being passing the contacting fluid through an essentially non-filtering traveling bed of ion exchange or ion concentrating resin in a direction which is essentially perpendicular to the flow of said traveling bed of ion exchange or ion concentrating resin beads (thereafter collectively called ion exchange). By essentially perpendicular is meant that the angle between the flow of the contacting fluid through the traveling ion exchange bed does not exceed about 15° to either side of a line perpendicular to the plane of flow of the traveling bed of ion exchange resin.

DETAILED DESCRIPTION OF THE INVENTION

The process and apparatus of the present invention is particularly useful when the contacting liquid contains suspended matter having a size of $\leq$ about 0.01 inch (0.0254 cm.), particularly $\leq$ about 0.008 inch (0.02032 cm.).

Figure 1:
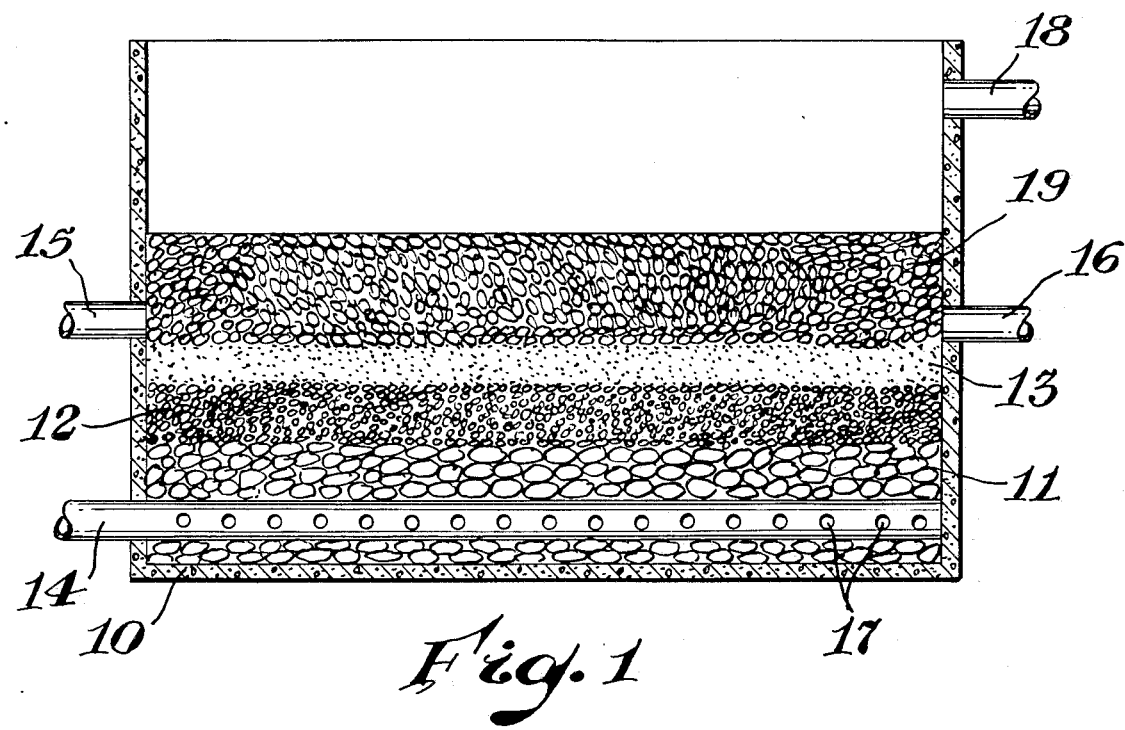
FIG. 1 is a cross section of a longitudinal view of a traveling bed ion exchange contactor.

FIG. 1 is a cross section of a longitudinal view of a traveling bed ion exchange contactor having a shell 10, a graded bed as a fluid distributor containing coarse gravel 11, fine gravel 12, and sand 13, a contacting fluid conduit 14, having perforations 17 to disperse said fluid throughout the length of the contacting portion of said contactor, an ion exchange resin inlet means 15 and outlet means 16, contacting fluid outlet means 18 and ion exchange resin 19.

Figures 2, 3:
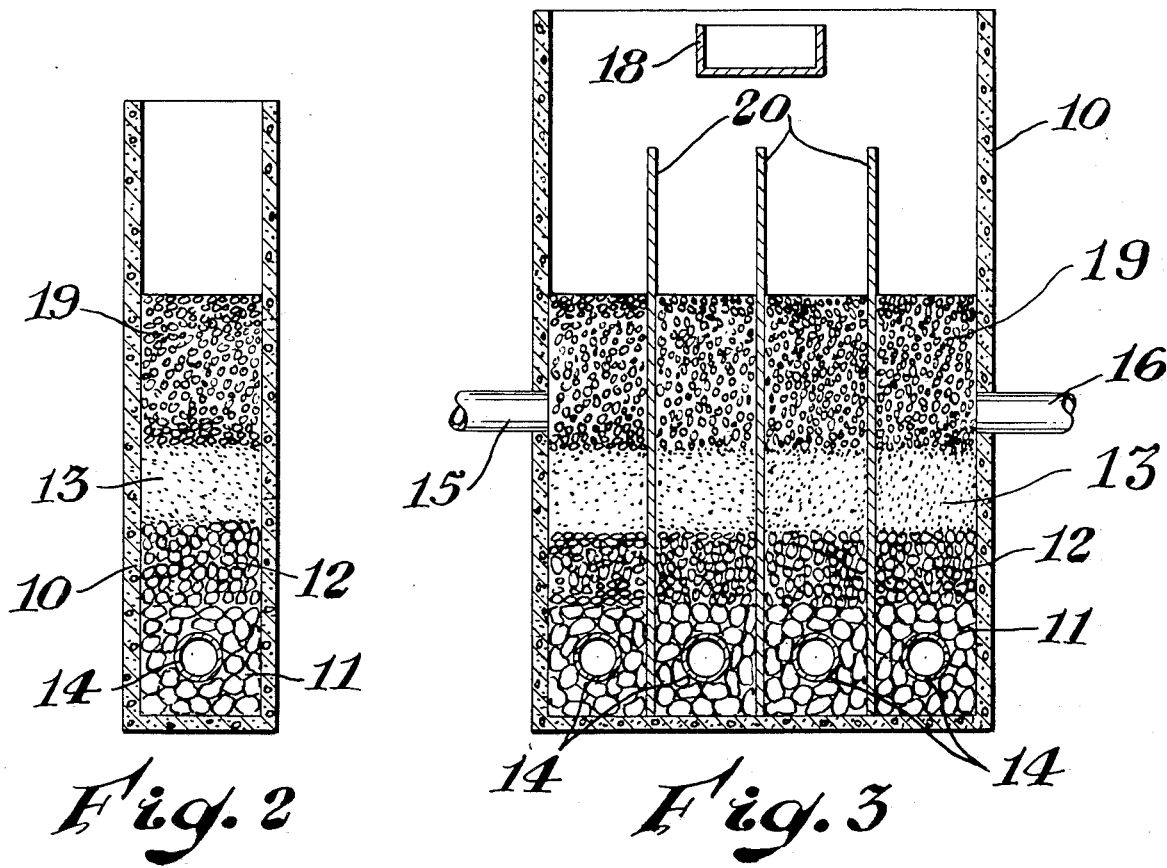
FIG. 2 is a cross sectional end view of a traveling bed ion exchange contactor.
FIG. 3 is a cross sectional end view of an ion exchange resin contactor containing baffler.

FIG. 2 is a cross-sectional end view of a contactor described in FIG. 1 showing the shell 10, the graded bed distributor having a layer of coarse gravel 11, a layer of fine gravel 12, and a layer of sand 13, a contacting fluid conduit 14 having perforations, not shown, and ion exchange resin 19.

FIG. 3 is a cross-sectional end view of an ion exchange resin contactor containing baffles so as to obtain the equivalent of great length in a compact area. Shown are the shell 10, a graded bed distributor having a coarse gravel layer 11, a fine gravel layer 12 and a sand layer 13, contacting fluid conduits 14 having perforations, not shown, ion exchange resin inlet means 15 and outlet means 16, contacting fluid outlet means 18, ion exchange resin 19 and baffles 20.

Figure 4:
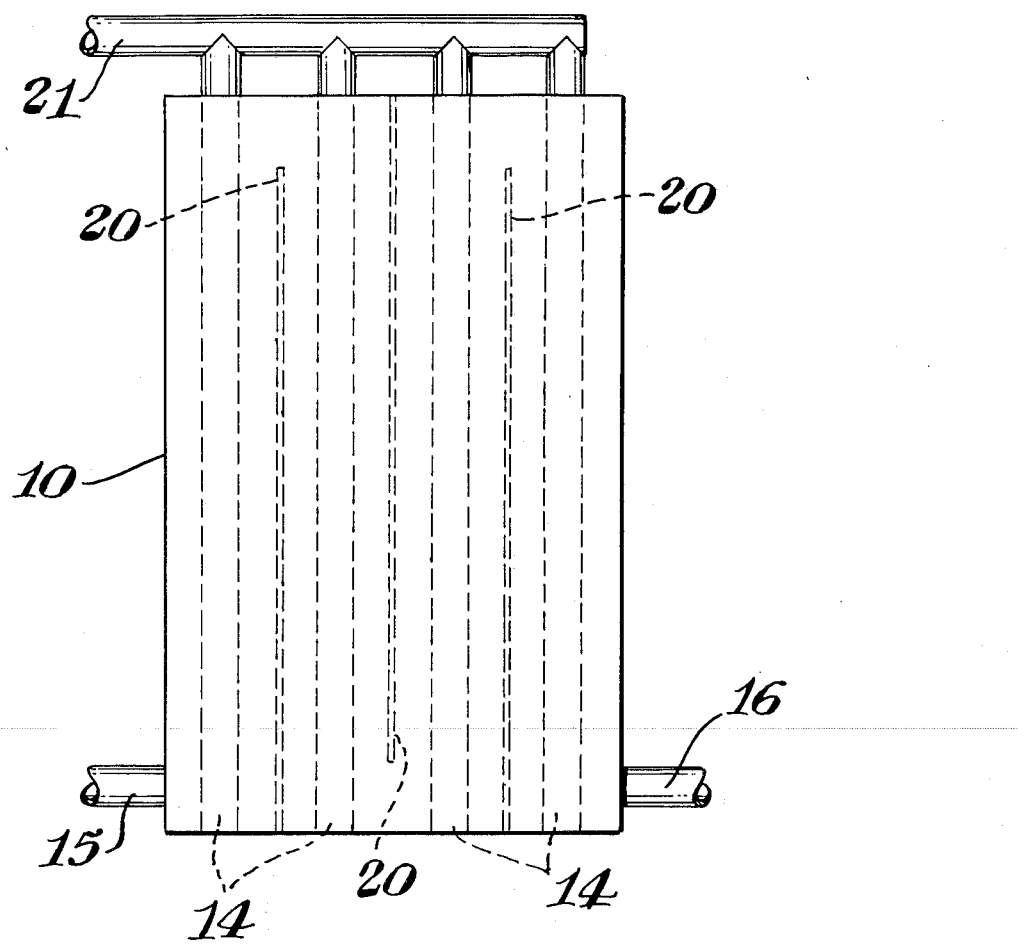
FIG. 4 is a top view of an ion exchange resin contactor containing baffles.

FIG. 4 is a top view of an ion exchange resin contactor containing baffles showing the shell 10, ion exchange inlet means 15, and outlet means 16, contacting fluid conduits 14, having perforations, not shown, baffles 20 and contacting fluid header 21.

In the contactor defined by FIGS. 3 and 4, the baffles 20, define compartments open at one end which contain the traveling ion exchange bed such that the flow is lengthwise from one compartment to the other. Within each compartment, the traveling bed of ion exchange resin is contacted with fresh contacting fluid as is shown by the header 21 in FIG. 4.

In some instances, it may be desirable to employ counter-current staging wherein the contacting liquid overflow from the last resin stage is collected and employed as the feed for a preceeding stage. Such could be employed to achieve a higher overall efficiency and one such means for accomplishing this is illustrated in FIG. 5.

Figure 5:
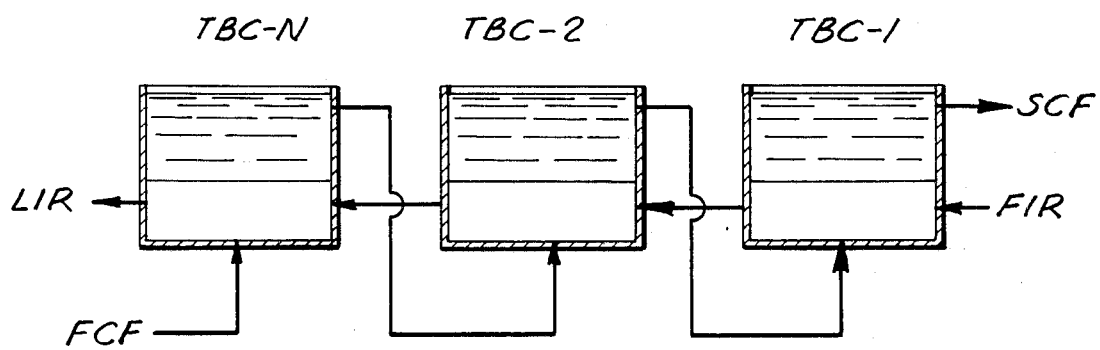
FIG. 5 is diagram depicting staging employing several ion exchange contactors in series.

FIG. 5 is a schematic of a plurality of traveling bed ion exchange contactors illustrated in FIGS. 1-4 and designated as TBC-1, TBC-2, TBC-N which are connected in series employing counter-current flow of the contacting fluid with respect to the traveling ion exchange resin bed in that the fresh contacting fluid is fed to the traveling bed ion exchange contactor last in the series with respect to the feed of fresh ion exchange contactor etc. The Fresh Ion Exchange Resin, FIR, is fed to the first traveling bed contactor TBC-1 and subsequently into the other traveling bed contactors TBC-2 through TBC-N. The Spent Contacting Fluid, SCF, is discharged from the traveling bed contactor which is first in the series TBC-1. Likewise, the Loaded Ion Exchange Resin, LIR, is discharged from the traveling bed contactor which is last in the series, TBC-N.

Figure 6:
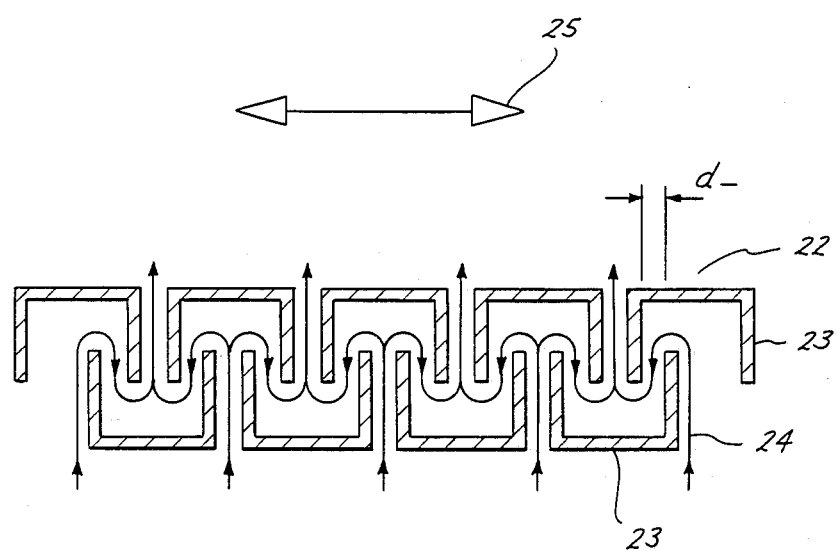
FIG. 6 is a cross sectional view of another distributing means.

FIG. 6 is a cross-sectional view of an alternate means for distributing the contacting fluid. This distributor would replace the graded bed distributing means illustrated in FIGS. 1, 2 and 3. As can readily be seen in FIG. 6, this distributor 22, is constructed of a plurality of channel members 23 maintained, by a means not shown, in a spaced apart relationship as illustrated in FIG. 6 which is not drawn to scale. The treating fluid would, after entering the contactor apparatus via, preferably, a perforated conduit as illustrated in FIGS. 1, 2 and 3 as 14 and not illustrated in FIG. 6, pass through the distributor 22, as illustrated by the small arrows 24. The space "d" in each instance being adjustable, by means not illustrated, so as to control flow and pressure drop through the distributor 22. The distributor illustrated by FIG. 6 is arranged in the ion exchange resin contactor such that the ion exchange resin would preferably travel in a direction perpendicular to the length of the channels 23, as shown by the large two headed arrow 25.

Figure 7:
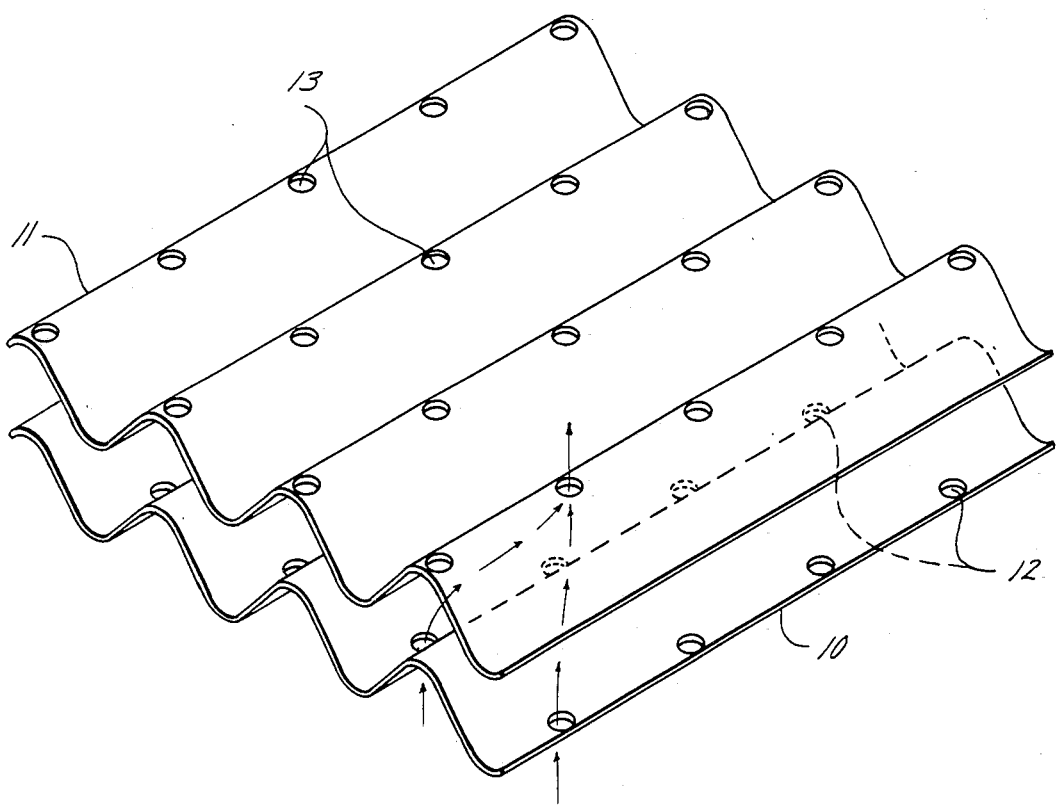
FIG. 7 is a perspective view of another distributor means.

FIG. 7 is a non-scalar perspective sectional view of another distributor means which is composed of at least two spaced apart corrugated sheets of material, 10 and 11, each sheet being provided with a multiplicity of holes (perforations) 12 and 13 respectively, said sheets being aligned with respect to the holes (perforations) in each sheet in a manner to produce a tortuous path for the liquid flowing therethrough, so as to prevent linear flow of liquid through adjacent sheets.

If desired the distributor can be constructed of 3, 4 or more perforated sheets. The material of construction of the sheets is unimportant so long as it is essentially nonreactive with or essentially noncorrosive when in contact with the treating components and the components being treated.

In the contactors of the present invention, the graded bed distributor and/or support can be prepared from materials other than gravel and sand so long as the material is inert to the ion exchange resin and the contacting liquid. Suitable such materials include ceramic or plastic tower packing materials such as Berl saddles, Raschig and Lessing rings and the like. The purpose of the graded bed or other distributor is to uniformly distribute the incoming contacting fluid and to create a support upon which the ion exchange resin moves. The graded bed can be employed in combination with other distributing means and also a single grade of particulate matter can be employed in combination with other distributing means.

Other methods for uniformly distributing the contacting fluid over the area of the traveling ion exchange resin bed are disclosed in *Chemical Engineers' Handbook*, Fifth Edition, McGraw-Hill, 1973, pp. 5-47 to pp. 5-55, including, as distributors, perforated pipes, tube banks, and as distributor and/or support, perforated plates and screens, as well as combinations thereof and the like.

Irrespective of the particular distribution means, it is so constructed that during operation it does not substantially filter out any suspended solid filterable material which may be contained in the liquid being treated.

The process and apparatus of the present invention is suitable for any ion exchange or ion concentrating process either anionic or cationic or neutral such as for example, water softening, partial demineralizing, uranium recovery from ores, recovery of copper and other soluble metals from water, sugar purification, brine purification, acid recovery, recovery of $MgCl_2$ from seawater and the like.

The ion exchange resins can be either anionic or cationic depending upon the ion desired to be removed from the contacting fluid. Suitable such resins include, for example those sold commercially under the tradenames of DOWEX, AMBERLITE and the like among which are DOWEX 4, DOWEX 50, DOWEX 2, DOWEX 3, DOWEX A-1, DOWEX 1, DOWEX 11, DOWEX 21-K, DOWEX 50W, AMBERLITE IR-20, AMBERLITE IR-22, AMBERLITE IR-24, AMBERLITE XE-100, AMBERLITE IRC-50, AMBERLITE XD-89, AMBERLITE IRA-401, AMBERLITE IRA-401S, AMBERLITE IRA-402, AMBERLITE IRA-405, AMBERLITE IRA-425, AMBERLITE IRA-45, AMBERLYST 15 and the like including mixtures thereof.

In addition to the traditional ion exchange resins wherein an ion from the ion exchange resin is replaced with ion from the liquid being treated, other particulate resins and substances are included in the processes and apparatus herein such as, for example complexing, zeolites, chelating, sequestering, coordination, absorption, and/or adsorption materials which can be either anionic, cationic or neutral which remove ions or molecules without replacement of the ions.

For purposes of brevity, all such ion exchange resins and/or materials shall be referred to in this specification and claims as ion exchange resins regardless of what method of exchange, complexing, coordination, absorption, adsorption and/or removal and the like actually occurs.

Suitable such absorption resins and materials which can be employed herein include, for example, the ion specific resins disclosed in U.S. Pat. Nos. 4,031,038, 4,098,867, 3,998,924, 4,159,311, 4,183,900, 4,221,767, 4,235,717, 4,243,555, 4,333,846, 4,347,327, 4,348,295, 4,348,296, 4,348,297, 4,366,261, allowed U.S. application Ser. Nos. 307,828, 307,827, 307,826, 307,825, and 307,830 filed Oct. 2, 1981 all of which are incorporated herein by reference.

Also suitable as absorption materials are imbiber beads commercially available from The Dow Chemical Company.

Also suitable as absorption resins are those ion exchange resin commercially available from The Dow Chemical Company as DOWEX® MWA-1, DOWEX® WGR and the like.

Suitable complexing coordination, chelating or sequestering resins and agents which can be employed herein include, for example, DOWEX® WGR, DOWEX® MWA-1, DOWEX® 1, XFS-43084 and XFS-4196 which are available from The Dow Chemical Company and AMBERLITE® IRA-93 commercially available from Rohm & Haas Company.

Suitable zeolites include, for example, those available from Davidson Chemical Company designated as S-41091 as well as those described in U.S. Pat. No. 4,364,909.

Suitable adsorption materials include, for example, activated carbon, and the like.

In those instances where it is desired to increase the quantities of fluid being treated but the velocity is such that the height of the fluidized bed is at is maximum with respect to the dimensions of the contactor apparatus, this can be accomplished by increasing the weight of the ion exchange resin according to the procedure described in allowed application Ser. No. 307,829 filed October 2, 1981 which is incorporated herein by reference.

The following examples are illustrative of the invention but are not to be construed as to limiting the scope thereof in any manner.

EXAMPLE 1

Employing an apparatus similar to FIGS. 1 and 2 approximately 2'×16'×4'(0.61 m×4.88 m×1.22 m) employing a graded bed of 6 inches (15.24 cm) coarse gravel, 3 inches (7.62 cm) of fine gravel and 3 inches (7.62 cm) of sand, seawater was passed through a perforated 3-inch (7.62 cm) O.D. pipe at a rate of 100 gallons per minute (6.309 l/s). Through the appropriate inlet was fed a mixture of 60 volume percent DOWEX 50-X8 (50–100 mesh) ion exchange resin in a feed liquor of river water and ion exchange resin containing 0.15 meq.*/ml calcium ions, 1.7 meq./ml sodium ions and 0.1 meq./ml magnesium ions.
*milliequivalents The seawater containing 75% salinity and 950 ppm** magnesium ions passed up through the graded bed and through the traveling bed of ion exchange resin in a direction essentially perpendicular to the flow of the ion exchange resin resulting in an ion exchange fluidized bed height of about 20 inches (50.8 cm). The contacted seawater was removed from the apparatus through an appropriate outlet approximately 2 feet (0.61 m) above the top of the traveling ion exchange bed. The seawater containing about 500 ppm magnesium ions was then removed from the overflow. The average resin velocity was about 0.8 ft/min (0.004 m/s) and the average seawater velocity was about 0.6 ft/min (0.003 m/s). The volume ratio of seawater to ion exchange resin was about 15:1. The ion exchange resin was removed from the opposite end of its feed point and was at a concentration of about 60 percent by volume in seawater-river water and contained 0.77 meq. of Mg$^{++}$/ml of resin. The ion exchange resin was then separated from the seawater-river water in a settling tank and regenerated with NaCl. The regeneration process employing NaCl to strip MgCl$_2$ from the loaded resin can be performed by known methods so as to produce a MgCl$_2$ solution in water. Such a MgCl$_2$ solution can be partially dehydrated and fed to an electrolytic magnesium cell for the production and recovery of magnesium metal and chlorine. The spent seawater was then discharged as a waste stream. Such a stream can be employed to carry the ion exchange resin instead of the river water employed above.
**parts per million

EXAMPLE 2

A 2 ft. (0.61 m) wide × 125 ft. (38.1 m) long traveling bed ion exchange contactor employing a 12 inch (30.48 cm) settled resin depth of DOWEX 50, 50–100 mesh ion exchange resin was employed to treat a river water stream containing a hardness of 200 ppm as CaCO$_3$ at a rate of 850 gpms. The thus treated water had a hardness as CaCO$_3$ of only 10 ppm.

EXAMPLE 3

(A) Present Invention

Data were collected on a 2 ft. (0.61 m) wide by 125 ft. (38.1 m) long traveling bed contactor using an 8 inch (20.32 cm) settled depth of DOWEX 50, 50–100 mesh ion exchange resin having an equilibrium loading value of 0.82 milliequivalents (meq.) of Mg$^{++}$per ml. After passing 16 bed volumes* of 75% salinity sea water through the contactor, the resin had a loading of 0.74 meq. Mg$^{++}$/ml which was an efficiency of 90%.
* Bed volume is a dimensionless measure of the volume of the contacting fluid based on the settled volume of the resin $$\left(V_B = \frac{V \text{ liquid}}{V \text{ resin}}\right).$$

(B) Comparative Experiment

A single stage hydroclone resin-seawater contactor employing essentially the same ion exchange resin was operated and required 30 bed volumes* of 75% salinity seawater to achieve the same resin loading.
* Bed volume is a dimensionless measure of the volume of the contacting fluid based on the settled volume of the resin $$\left(V_B = \frac{V \text{ liquid}}{V \text{ resin}}\right).$$

The above clearly demonstrates the improved efficiency of the traveling bed ion exchange contactor and process employing same over a single stage ion exchange contactor not of the traveling bed type in that less seawater need be contacted to achieve the same resin loading value when employing the contactor and process of the present invention.

EXAMPLE 4

A traveling bed ion exchange apparatus was constructed of ¼" plexiglass panels. The inside length and width were 18 inches (45.72 cm) and 6 inches (15.24 cm), respectively. The height was 15 inches (38.1 cm). Attached to the front wall and running parallel to, and three inches (7.62 cm) from each side wall, was an internal path separation wall 8 inches (20.32 cm) high. It extended only 15 inches (38.1 cm) down the length of the bed. This left a 3 inch (7.62 cm) space in which the traveling resin could turn 180° and move toward the front wall.

A 5 inch (12.7 cm) high weir wall was attached perpendicularly to, and running between, the path separation wall and the right wall. The weir wall was 3¼" (8.255 cm) from the front wall blocking the right path of the bed. This positioning created a 3¼"×3" (8.255 cm×7.62 cm) resin collector, at the end of the traveling bed path.

An effluent trough was attached to the left wall and was supported by the front and back walls of the traveling bed. The trough was two inches (5.08 cm) wide and one inch (2.54 cm) deep. It extended through the front wall for a distance of eleven inches (27.94 cm). There were three one-eighth inch (0.3175 cm) holes drilled in the center of the trough at four, eight, and twelve inches (10.16, 20.32 and 30.48 cm) from the back wall. A drip lip extended downward, at the front end of the trough, for one and one quarter inches (3.175 cm).

The feed input apparatus consisted of a ⅜" (0.9525 cm) stainless steel tubes blocked off at the back end. In each tube there were thirty-four three-thirty seconds inch (0.238125 cm) holes drilled one inch (2.54 cm) apart. The holes were in two columns, 90° degrees apart and one column began and ended one-half inch (1.27 cm) ahead of the other. The tubes extended 17 inches (43.18 cm) into the bed from the front wall and were positioned one inch (2.54 cm) above the bottom. The tubes were connected by elbows and T's outside the front wall of the traveling bed so that feed coming in would flow into the bed in even distribution throughout the length of the bed.

A one-half inch (1.27 cm) plastic tube connected the stainless steel flow distributors to a little giant pump adjusted by a ball valve to flow at three gallons per minute per square foot (2.04 liters per second per square meter). From the little giant pump to the feed reservoir, there ran another one-half inch (1.27 cm) tube. The feed reservoir consisted of a plastic fifty-five gallon (208.197 l) drum with two hundred liters of feed.

In the center of the bottom of the resin collector (defined by the weir wall, the front wall, the right wall, and the path separation wall) there was a hole drilled and threaded to accommodate a three-eights inch (0.9525 cm) tubing elbow. The elbow was screwed into the bottom panel and attached on the outside to a one-half inch (1.27 cm) valve. From the ball valve there extended a one-half inch (1.27 cm) I.D. black rubber hose, it attached to a Gorman-Rupp Model 12500-13 vibrating pump. Another one-half inch (1.27 cm) hose extended from the pump discharge to a bucket. The resin collector, tubing elbow, valve, hose, pump, and bucket made up the resin removal system for the traveling bed.

The resin input system consisted of a six and one-half inch, (16.51 cm) funnel with a three inch (7.62 cm) extention of rubber hose on the bottom. It was positioned so that resin would be fed into the front end of the bed in the left path and two inches (5.08 cm) from the front wall. Before the experiment was run, four and one-half inches (11.43 cm) of a cleaned coarse sand, ranging in particle size from 8 mesh to 50 mesh, was placed in the bed as an additional flow distributor.

The Feed

The feed for the traveling bed experiment was made up to be ~30 ppm $Cu^{++}$. To make 200 liters of feed, 23.6 g $CuSO_4 \cdot 5H_2O$ was added to 200 liters of DI $H_2O$. In addition, 2.85 g $FeCl_2 \cdot 4H_2O$ was added to the feed to give an iron content of ~4 ppm $Fe^{++}$.

The Resin

A chelating picolylamine resin #XFS-43084 available from The Dow Chemical Company was used for this experiment. Total quantity used was ~1200 cc resin.

The Experiment

The feed solution of ~32 ppm $Cu^{++}$ was upflowed into the traveling bed at 3 gpm/ft². Temperature of feed =31° C., pH of feed =2.75. The feed was allowed to enter the system until it overflowed through the effluent trough. At that time, a stop watch was started. Also, resin was spooned into the system at a rate of 100 cc resin per minute (1.67 cc per s). At the end of each minute (60 s), a 20 cc plastic syringe with a rubber tube attached was extended into the bed at the center of the turnaround point. Two samples of effluent were drawn about one inch (2.54 cm) above the resin and/or sand. A total of seventeen samples were taken in this manner. A feed sample was also taken from the feed reservoir and effluent samples (3) from the effluent trough were taken at 5, 11, and 17 minutes (300, 660 and 1020 s) into the run.

The resin put into the system flowed down the left path of the bed to the back wall, turned around the path separation wall, and moved back to the front of the bed. It moved to the weir wall, and as excess resin was added through the funnel, resin at the weir wall was pushed into the resin collector and pumped into a bucket. At the end of the sampling of Sample #17, the feed pump was turned off.

The Results

The samples from this experiment were analyzed on a Perkin Elmer Model 2380 atomic absorption spectrometer. The results were as follows:

| Sample | Bed Volume Effluent | ppm $Cu^{++}$ |
| --- | --- | --- |
| Feed | 0 | 32 |
| 1 | 14.1 | 20 |
| 2 | 28.14 | 19 |
| 3 | 42.3 | 18.7 |
| 4 | 56.3 | 18 |
| 5 | 70.5 | 18 |
| 6 | 84.6 | 18.5 |
| 7 | 98.7 | 18 |
| 8 | 112.8 | 17.8 |
| 9 | 126.9 | 18 |
| 10 | 141.1 | 18.6 |
| 11 | 155.2 | 19.6 |
| 12 | 169.3 | 19 |
| 13 | 183.4 | 18.5 |
| 14 | 197.5 | 18.7 |
| 15 | 211.6 | 20 |
| 16 | 225.7 | 21.5 |
| 17 | 240.1 | 21.5 |

It should be noted that Sample 1 was taken before the resin reached the turn-around where the sampling was done. Therefore, it is safe to say that the sand itself had some attraction for the copper ion. The numbers also show that when the resin had passed the sampling point (at between Sample 2 and Sample 3) a drop of ~2 ppm was observed.

I claim:
1. In a process for concentrating ions or removing ions from a liquid containing suspended filterable matter having a particle size ≦ about 0.01 inch by contacting said liquid with an ion exchange resin, the step of performing said contact by passing the liquid upward through a horizontally traveling, fluidized, essentially non-filtering bed of an ion exchange resin in a direction essentially perpendicular to the direction of the plane of flow of said traveling fluidized bed of ion exchange resin and wherein said liquid passes upward through a non-filtering distributor means to uniformily distribute the liquid prior to contact with said traveling bed of ion exchange resin; said fluidization resulting from the passage of the liquid into and through said ion-exchange resin, said fluidization being such as to essentially prevent filtration of said filterable matter in said bed; and wherein said distributor and said traveling bed of ion exchange resin are within the confines of the same apparatus.

2. A process of claim 1 wherein said distributor means is selected from the group consisting of (a) graded bed or graded beds; (b) perforated pipe or perforated pipes; (c) tube bank or tube banks, (d) perforated plate or perforated plates; (e) screen or screens; (f) tower packing; (g) channel members; (h) perforated corrugated sheets; and (i) any combination thereof; and wherein said filterable matter has a particle size of ≦ about 0.008 inches.

3. A process of claim 2 wherein the distributing means is a graded bed.

4. A process of claim 2 wherein said distributing means is constructed of a plurality of adjacent channel members associated with a plurality of opposing channel members, the combination arranged in a manner which causes a tortuous flow of liquid within the confines of said combination of channel members so as to provide a substantially uniform flow of liquid up through said bed of ion exchange resin.

5. A process of claim 2 wherein said distributing means is constructed of a plurality of corrugated sheets of material which are provided with perforations and which are aligned such that the flow of liquid therethrough is in a tortuous manner.

6. A process of claim 1, 2, 3, 4 or 5 wherein said ion-exchange resin is a cation exchange resin and said contacting liquid is water.

7. A process of claim 1, 2, 3, 4 or 5 wherein said ion exchange resin is an absorption, adsorption, coordination, chelating, sequestering or complexing resin or material and said contacting liquid is water containing a material which said ion exchange resin or material is capable of removing.

8. In an ion concentrating or removing process wherein a liquid, containing suspended filterable matter having a particle size of ≦ about 0.01 inch is treated by contacting the liquid with an ion exchange resin in a continuous manner; the improvement which comprises:
(A) establishing an elongated, continuous, horizontally traveling, essentially non-filtering, fluidized bed of ion exchange resin particles;
(B) passing said liquid from an essentially non-filtering means for uniformly distributing said liquid in a manner so as to provide for a continuous flow
    (1) upward through said bed of ion exchange resin in a direction essentially perpendicular to the direction of flow of said horizontally traveling bed of ion exchange resin; and
    (2) at a rate sufficient to maintain said bed in a fluidized, essentially non-filtering state;
(C) providing a means selected from said distributing means or a planar member positioned above said distributing means as a support along which said fluidized bed of ion exchange resin moves;
(D) said distributing means and said bed of ion exchange resin being within the confines of the same apparatus; and
(E) feeding resin to one end of said apparatus and withdrawing resin from the other end of said apparatus after contact with the liquid.

9. A process of claim 8 wherein said distributor means is selected from the group consisting of (a) graded bed or graded beds; (b) perforated pipe or perforated pipes; (c) tube bank or banks; (d) perforated plate or perforated plates; (e) screen or screens; (f) tower packing; (g) channel members; (h) perforated corrugated sheets; and (i) any combination thereof; and wherein said filterable matter has a particle size of ≦ about 0.008 inches.

10. A process of claim 9 wherein the distributing means is a graded bed.

11. A process of claim 9 wherein said distributing means is constructed of a plurality of adjacent channel members associated with a plurality of opposing channel members, the combination arranged in a manner which causes a tortuous flow of liquid within the confines of said combination of channel members so as to provide a substantially uniform flow of liquid up through said bed of ion exchange resin.

12. A process of claim 9 wherein said distributing means is constructed of a plurality of corrugated sheets of material which are provided with perforations and which are aligned such that the flow of liquid therethrough is in a tortuous manner.

13. A process of claim 8, 9, 10, 11 or 12 wherein said ion-exchange resin is a cation exchange resin and said contacting liquid is water.

14. A process of claim 8, 9, 10, 11, or 12 wherein said ion exchange resin is an absorption, adsorption, coordination, chelating, sequestering or complexing resin or material and said contacting liquid is water containing a material which said ion exchange resin is capable of removing.

15. An ion exchange resin contactor comprising
(a) a shell
(b) as an essentially non-filtering means for substantially uniformly distributing a liquid upwardly throughout said shell, a graded bed,
(c) a bed of ion concentrating beads above said distributing means
(d) means for feeding and removing resin from said shell, and
(e) means for feeding and removing liquid from said shell; wherein
(f) said distributing means is located in the lower portion of said shell and is of a size to carry sufficient liquid at a velocity whereby particles of a size ≦0.01 inch will remain substantially suspended and/or carried with said liquid upward through said distributing means and upward through said resin bed to said liquid removing means,
(g) said bed of ion concentrating beads is supported on and above said distributing means said beads being of a size to be fluidized by the liquid rising from said distributing means to an extent to exhibit a non-filtering mode to said particles in the liquid and
(h) said bed of beads moves in a horizontal direction toward said bead removing means.

16. A liquid-solid contactor comprised of
(a) a horizontionally disposed shell to contain a liquid,
(b) disposed within said shell in the lower portion thereof as a means to distribute a liquid substantially uniformly throughout said shell, a graded bed, (c) a bed of ion concentrating beads disposed above said distributing means, (d) a means to feed ion concentrating beads to said bed, (e) a means to remove ion concentrating beads from said bed following their exposure to said liquid, (f) a means to feed liquid to said distributing means, (g) a means to remove liquid from said shell after contact with said ion concentrating beads, said feed means being of a size to deliver liquid at a velocity to said distributor means and said bed to maintain filterable particles less than 0.01 inch in suspension throughout the passage of said liquid through said shell, distributor and bed, said ion concentrating beads being of a size to remain suspended in the liquid flowing upwardly and to move horizontally as the beads are withdrawn from said shell.

17. An ion exchange resin contactor, comprising (a) a horizontally disposed shell; (b) contained within said shell, as a horizontally disposed liquid distributing means positioned in the lower extreme of said shell, a graded bed, said distributing means being capable of supporting a bed of ion exchange resin beads; (c) a bed of ion exchange resin beads; (d) a means for continuously feeding and a means for continuously removing said bed of ion exchange resin beads such that said ion exchange resin beads travel horizontally along said distributing or supporting means; (e) a means for conducting to and for passing a contacting liquid to be treated upward through said distributing or supporting means and upward through said bed of ion exchange resin beads in a direction essentially perpendicular to the plane of flow of said bed of ion exchange resin beads at a liquid velocity so as to maintain said bed of ion exchange resin beads in an essentially non-filtering fluidized state; and (f) a means for removing said contacting liquid after its contact with said bed of ion exchange resin beads;

wherein said distributor means is of a configuration and said ion exchange resin beads are of a size sufficient to be fluidized by the passage of said treating fluid therethrough to the extent that suspended filterable material having a particle size $\leq$ about 0.01 inch will not be substantially filtered from said fluid, and said conducting means being of a size sufficient to carry said treating fluid at a velocity such as to maintain said filterable material suspended in said treating liquid while passing through each of said conducting means, distributor means, bed of ion exchange resin beads and contacting liquid removing means.

18. A contactor of claim 15, 16 or 17 which additionally contains one or more baffles for extending the length of travel of said ion exchange resin in a manner so that the once precontacted fluidized ion exchange resin particles separately contact fresh contacting liquid.

* * * * *